J. W. WAMPLER.
GAS SERVICE PIPE.
APPLICATION FILED FEB. 21, 1920.
1,393,987.
Patented Oct. 18, 1921.
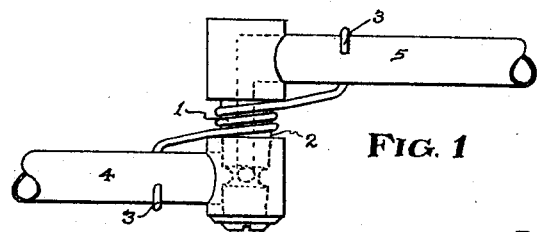
FIG. 1
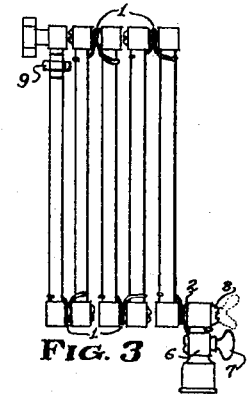
FIG. 3
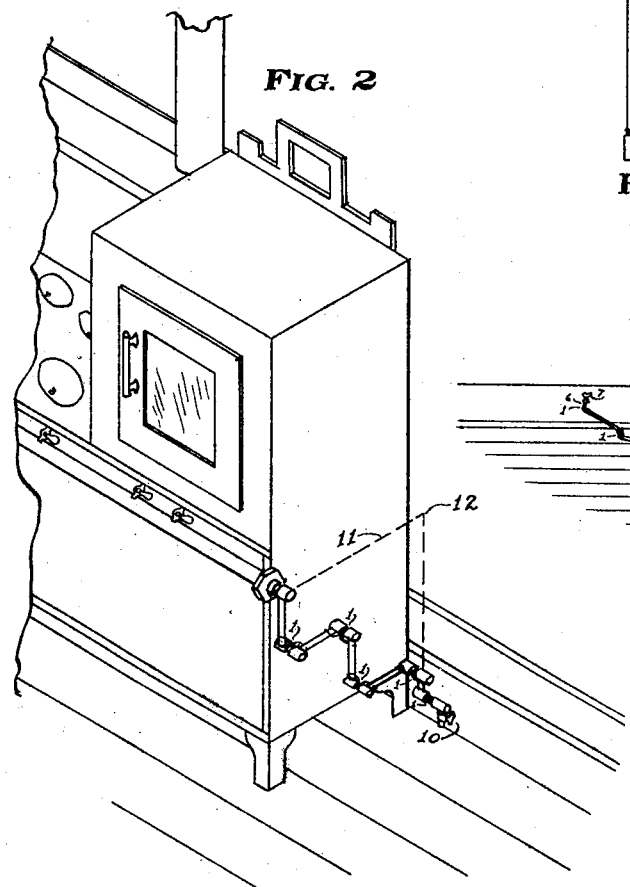
FIG. 2
FIG. 4
INVENTOR
John W. Wampler
BY
U. G. Charles
ATTORNEY

UNITED STATES PATENT OFFICE.

JOHN W. WAMPLER, OF WICHITA, KANSAS.

GAS SERVICE-PIPE.

1,393,987.    Specification of Letters Patent.    Patented Oct. 18, 1921.

Application filed February 21, 1920. Serial No. 360,540.

*To all whom it may concern:*

Be it known that I, JOHN W. WAMPLER, a citizen of the United States, and a resident of Wichita, in the county of Sedgwick and State of Kansas, have invented certain new and useful Improvements in Gas Service-Pipes, of which the following is a description, referring to the accompanying drawings, which form a part of this specification.

My invention relates to improvements in gas service pipes in which the pipe is composed of a plurality of metallic members pivotally joined and adapted to fold by action of joint springs.

The object of my invention is to construct a connecting pipe of metal with pivoted joints so that a small stove may be placed at any location within the length of the pipe. My object is to eliminate the use of the ordinary flexible hose which is commonly used and is subject to deterioration and leakage of gas in the room.

At each end of the series of members a union is provided to connect with the wall pipe opening and the wall service supply pipe. When the said pipe is disconnected it will automatically fold itself into a small space making it convenient for packing or storing away when not in use. If either end be detached the pipe will fold as heretofore described the same as if it were detached at both ends folding together at the connected end.

I attain these objects by the mechanism illustrated in the accompanying drawings in which—

Figure 1 is a detail drawing of the pivoted joint. Fig. 2 is a perspective of a stove showing the method of connecting the gas service pipe. Fig. 3 is an elevation of the service pipe folded by action of the springs. Fig. 4 is a view showing the pipe connected with a small stove with pivoted joints set perpendicular for horizontal movement.

Similar characters refer to similar parts in the drawings.

1, is the spring which coils around the pivot connection 2, the ends of which are looped around the pipe as shown at 3 and the tension of said spring will cause the joint to turn, and the pipes 4 and 5 will stand in line paralleling with each other, and the adjacent joints at either end of the pipes will have like springs with tension reversing movement and folding the pipe to a similar position as above described, and as shown in Fig. 3. 6 is a valve which is screwed on the end of the wall supply pipe. To disconnect the folding pipe the stop 7 is turned to cut off the gas. Then remove the screw 8 or thumb nut as indicated by dotted lines. The pivot 2 can be removed allowing the pipe to fold as heretofore described. To disconnect from the range a union is provided as shown at 9.

In Fig. 2 is illustrated how the pipe may be connected to the stove and drawn in an angling direction and connected to the wall service pipe 10, or, if desired, the pipes may be forced in the position as shown by dotted line 11, but if such position is required the pipe must be fastened to the wall bending it at right angle as shown by dotted line 11 at 12, and any means for fastening may be employed as by the use of a hook, a strap or stirrup, passing over the pipe, the ends of which will be rigidly attached to the wall.

The pipes and connections referred to in my invention are to be of standard make and similar to those used in common gas light elbow extensions, which allows the gas to pass freely through the pipe and pivoted joints, regardless of what position they may be turned. I do not claim this combination broadly; but

I claim:

A gas service pipe for connection with gas burning appliances, said pipe comprising a plurality of short straight pipe sections, a pivotal connection between each section and an adjacent section, the axes of all of said connections being parallel, each said connection comprising a neck; a spring for each of said connections, each spring comprising an intermediate helical portion coiled around the neck of the connection, the ends of the spring being hooked over the connected pipe sections in such manner that the spring exerts a turning pressure tending to bring the sections of the pipe into parallelism.

JOHN W. WAMPLER.

Witnesses:
N. D. WILBUR,
W. A. NETHERCOT.